US006802539B2

(12) United States Patent
Cooke et al.

(10) Patent No.: US 6,802,539 B2

(45) Date of Patent: Oct. 12, 2004

(54) CONNECTOR ARRANGEMENT

(75) Inventors: Michael Peter Cooke, Gillingham (GB); John Roderick Jefferson, Gillingham (GB)

(73) Assignee: Delphi Technologies, Inc., Troy, MI (US)

(*) Notice: Subject to any disclaimer, the term of this patent is extended or adjusted under 35 U.S.C. 154(b) by 274 days.

(21) Appl. No.: 10/161,268

(22) Filed: May 31, 2002

(65) Prior Publication Data

US 2002/0163188 A1 Nov. 7, 2002

Related U.S. Application Data

(62) Division of application No. 09/648,725, filed on Aug. 25, 2000.

(51) Int. Cl.[7] ..................... F16L 41/02

(52) U.S. Cl. .................... 285/124.1; 285/188; 123/468; 123/469

(58) Field of Search ........................... 285/124.1, 124.2, 285/124.3, 124.4, 124.5, 125.1, 188, 130.1; 123/468, 469, 465, 452

(56) References Cited

U.S. PATENT DOCUMENTS

| | | | | | |
|---|---|---|---|---|---|
| 1,363,713 | A | | 12/1920 | Broido | |
| 2,892,453 | A | * | 6/1959 | Stoll | 123/452 |
| 2,937,636 | A | * | 5/1960 | Aldinger et al. | 123/452 |
| 4,468,054 | A | | 8/1984 | Orth | 285/137 |
| 4,660,531 | A | * | 4/1987 | Lauterbach et al. | 123/456 |
| 4,955,409 | A | * | 9/1990 | Tokuda et al. | 137/561 A |
| 5,024,198 | A | * | 6/1991 | Usui | 123/468 |
| 5,071,172 | A | | 12/1991 | Gross | 285/137.1 |
| 5,109,822 | A | * | 5/1992 | Martin | 123/456 |
| 5,146,766 | A | | 9/1992 | Martins | 62/298 |
| 5,222,771 | A | * | 6/1993 | Imura | 285/288.2 |
| 5,295,467 | A | * | 3/1994 | Hafner | 123/456 |
| 5,383,690 | A | | 1/1995 | Niemeirer et al. | 285/137.1 |
| 5,390,638 | A | | 2/1995 | Hornby et al. | 123/456 |
| 5,415,437 | A | | 5/1995 | Asou et al. | 285/137.1 |
| 5,695,225 | A | | 12/1997 | Grenga | 285/150 |
| 5,803,051 | A | * | 9/1998 | Stehr | 123/456 |
| 5,820,167 | A | | 10/1998 | Linkner, Jr. | 285/124.1 |
| 5,979,945 | A | | 11/1999 | Hitachi et al. | 285/125.1 |
| 6,314,946 | B1 | * | 11/2001 | Funakura et al. | 123/509 |
| 6,341,597 | B1 | * | 1/2002 | Cohen | 123/516 |
| 6,460,568 | B1 | * | 10/2002 | Goodwin | 137/561 A |
| 2002/0190521 | A1 | * | 12/2002 | Tikk et al. | 285/125.1 |

FOREIGN PATENT DOCUMENTS

| | | |
|---|---|---|
| DE | 3810385 | 3/1989 |
| DE | 3825313 | 1/1990 |
| FR | 598607 | 12/1925 |
| FR | 700784 | 3/1931 |
| GB | 330301 | 6/1930 |

* cited by examiner

*Primary Examiner*—Eric K. Nicholson
(74) *Attorney, Agent, or Firm*—Thomas N. Twomey

(57) ABSTRACT

A connector arrangement for use in a fuel system, the connector arrangement comprising a bridge member shaped for cooperation with at least first and second members to be connected to a housing, and a clamp arrangement for clamping the bridge member to the housing, the bridge member transmitting a clamping load from the clamp means to the first and second members. The invention also relates to a connector arrangement comprising a plurality of high pressure fuel pipes which are supplied with fuel from a common inlet passage, the common inlet passage being arranged, in use, to receive fuel from a high pressure fuel supply. Each of the pipes comprises one or more outlet region which is connectable with an inlet region of a respective injector forming part of the fuel system to permit high pressure fuel to be supplied to said injector.

18 Claims, 8 Drawing Sheets

1 / 8

FIG 14
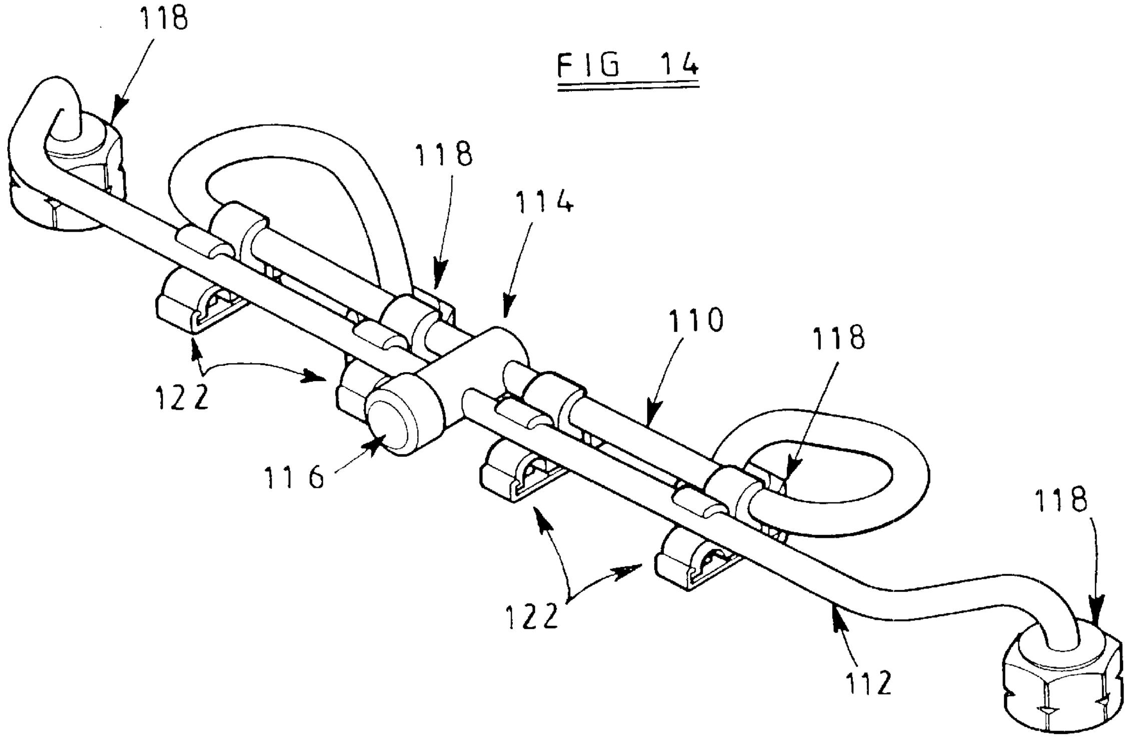
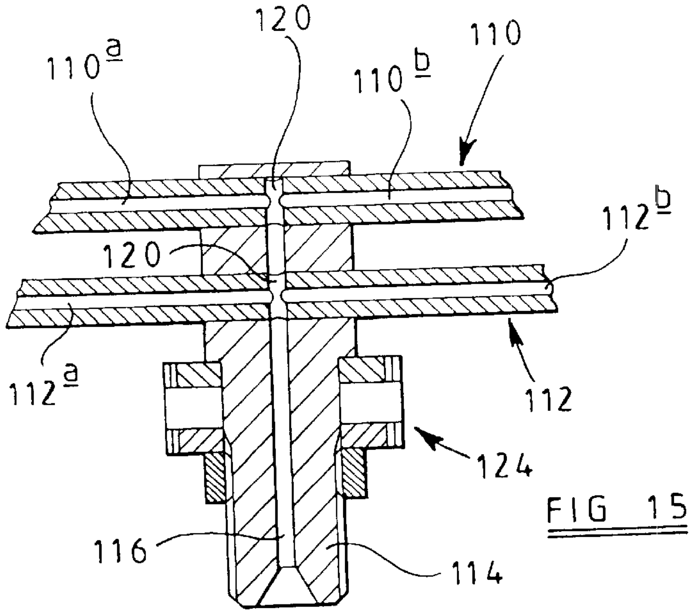
FIG 15

CONNECTOR ARRANGEMENT

This is a division of application Ser. No. 09/648,725, filed on Aug. 25, 2000.

TECHNICAL FIELD

The invention relates to a connector arrangement for use in a fuel system. In particular, the invention relates to a connector arrangement whereby a plurality of high pressure fuel pipes can be connected, and sealed, to a housing. The invention also relates to a connector arrangement for permitting a plurality of high pressure fuel pipes to be connected to a plurality of fuel injectors in an internal combustion engine.

BACKGROUND OF THE INVENTION

Conventional high pressure fuel pipe connector arrangements are relatively bulky, thus where a plurality of pipes are to be connected to a common housing, the housing must be relatively large. It is thought that the complexity of a common rail fuel system may be reduced by connecting the high pressure fuel pipes for the various injectors directly to an accumulator housing or other housing associated with the fuel pump. However, as conventional connector arrangements are relatively bulky, the connection of several such pipes is difficult. It is one object of the invention to provide a connector arrangement suitable for use in such applications.

It is also a requirement in such systems to connect each of the injectors to a common high pressure fuel supply. It is a further object of the invention to provide a connector arrangement which achieves this function.

SUMMARY OF THE INVENTION

According to a first aspect of the invention, there is provided a connector arrangement for use in a fuel system, the connector arrangement comprising a bridge member shaped for cooperation with at least first and second members to be connected to a housing, and clamp means for clamping the bridge member to the housing, the bridge member transmitting a clamping load from the clamp means to the first and second members.

In particular, but not exclusively, the connector arrangement is suitable for use in an engine. The first and second members may both comprise fuel pipes. Alternatively one of the first and second members may comprise a blanking member.

The housing conveniently comprises an accumulator housing of a fuel pump, the housing being provided with passages whereby, in use, an accumulator chamber located within the accumulator housing communicates with the or at least one of the fuel pipes. Alternatively, the housing may comprise a manifold suitable for mounting at an outlet of a fuel pump.

The clamp means may comprise a bolt which extends through the bridge member and which is in threaded engagement with the housing. Alternatively, the clamp means may include a screw-threaded clamp arrangement and a load transmitting member arranged to transmit the clamping load to the bridge member. Conveniently a plurality of bridge members are provided, the load transmitting member transmitting the clamping load to all of the bridge members.

According to a second aspect of the invention there is provided a connector arrangement comprising a manifold to which a plurality of fuel pipes are permanently mounted.

The manifold is conveniently adapted to be mounted at an outlet of a fuel pump. The fuel pipes may, for example, be brazed or welded to the manifold.

By providing techniques whereby a plurality of fuel pipes can be secured to a manifold or housing, it will be appreciated that the provision of a separate common rail can be avoided, and hence that a "common rail" type fuel system of reduced complexity can be provided.

According to a third aspect of the present invention, there is provided a connector arrangement for use in a fuel system, the connector arrangement comprising a plurality of high pressure fuel pipes which are supplied with fuel from a common inlet passage, the common inlet being arranged, in use, to receive fuel from a high pressure fuel supply, each of the pipes comprising one or more outlet region which is connectable with an inlet region of a respective injector forming part of the fuel system to permit high pressure fuel to be supplied to said injector.

The connector is particularly suitable for use in supplying fuel to an internal combustion engine.

Conveniently, each of the high pressure fuel pipes defines at least one flow passage for fuel between the common inlet passage and the inlet region of an associated injector.

Preferably, each of the flow passages for fuel has substantially the same length. As fuel is supplied to each of the injectors along a flow passage having substantially the same length, fuelling consistency between the injectors is improved.

Conveniently, one or more of the high pressure fuel pipes may be provided with an attachment member for attaching a component to the respective high pressure fuel pipe. For example, the attachment member may be used to mount an electrical connector, electrical wiring or a low pressure fuel pipe on the high pressure fuel pipe.

As the connector arrangement according to the third aspect of the present invention can be relatively compact, the connector arrangement may be mounted, in use, under the cam cover of the engine.

Preferably, the connector arrangement may comprise two high pressure fuel pipes, each of the pipes defining two flow passages for high pressure fuel, each of the flow passages permitting fuel to be delivered from the high pressure fuel supply to the inlet region of an associated injector.

Conveniently, the common inlet passage is arranged to communicate with each of the high pressure fuel pipes a part of the way along the length of each of the pipes.

Conveniently, the connector arrangement may include an inlet member which defines the common inlet passage for fuel.

The inlet member may be provided with two through bores, each of the bores having a high pressure fuel pipe extending therethrough. As the high pressure pipes extend through the inlet member, the forces on the high pressure pipes are balanced and the pipes are not subjected to undesirable axial forces.

Each of the high pressure fuel pipes may be provided with a cross drilling to permit communication between the high pressure fuel pipe and the common inlet passage.

At least one of the high pressure fuel pipes may be provided with a closure member to seal an open end of the respective fuel pipe. In particular, this embodiment of the invention may be used in an engine having an odd number of injectors.

The connector arrangement may further comprise a seal assembly for providing a substantially fluid tight seal between the connector arrangement and, for example, the cam cover and/or the engine block of the engine in which the connector arrangement is used.

According to a fourth aspect of the invention, there is provided a seal assembly for use with a connector arrangement as herein described, the seal assembly comprising a resilient seal member and first and second plate members, the first and second plate members being arranged to apply a force to opposing faces of the seal member such that, upon assembly of the seal assembly, the application of a force to at least one of the plate members serves to deform the seal member into sealing engagement with a surface associated with the fuel system.

Conveniently, the seal member may be arranged to sealingly engage a surface of a cam cover or engine block of the associated engine.

The seal member may be provided with a substantially flat surface for engaging a substantially flat surface of the engine block or the cam cover to provide a substantially fluid tight seal. Alternatively, the seal member may be arranged to be received within an aperture in the cam cover or the engine block of the engine.

The connector arrangement may include a further pipe and a further inlet member, the further pipe being arranged to communicate with the common inlet passage and a high pressure fuel supply. Conveniently, each end of the further pipe may be arranged to communicate with the common inlet passage of a connector arrangement in accordance with the present invention. This embodiment of the invention is particularly suitable for use in "vee" type engines.

According to a fifth aspect of the present invention, there is provided a method of manufacturing a connector arrangement as herein described comprising the steps of;

providing an inlet member with at least one through bore;

inserting a pipe for carrying high pressure fuel through the bore in the inlet member; and forming an inlet passage through the inlet member such that the inlet passage communicates with a flow passage defined by the pipe to permit fuel in the inlet passage to be supplied to the flow passage, in use.

BRIEF DESCRIPTION OF THE DRAWINGS

The invention will further be described, by way of example, with reference to the accompanying drawings, in which:

FIG. 14 is a perspective view of a connector arrangement in accordance with a still further embodiment of the present invention;

FIG. 15 is a plan sectional view of a part of the connector arrangement in FIG. 14;

DESCRIPTION OF THE PREFERRED EMBODIMENT

Figure 1:
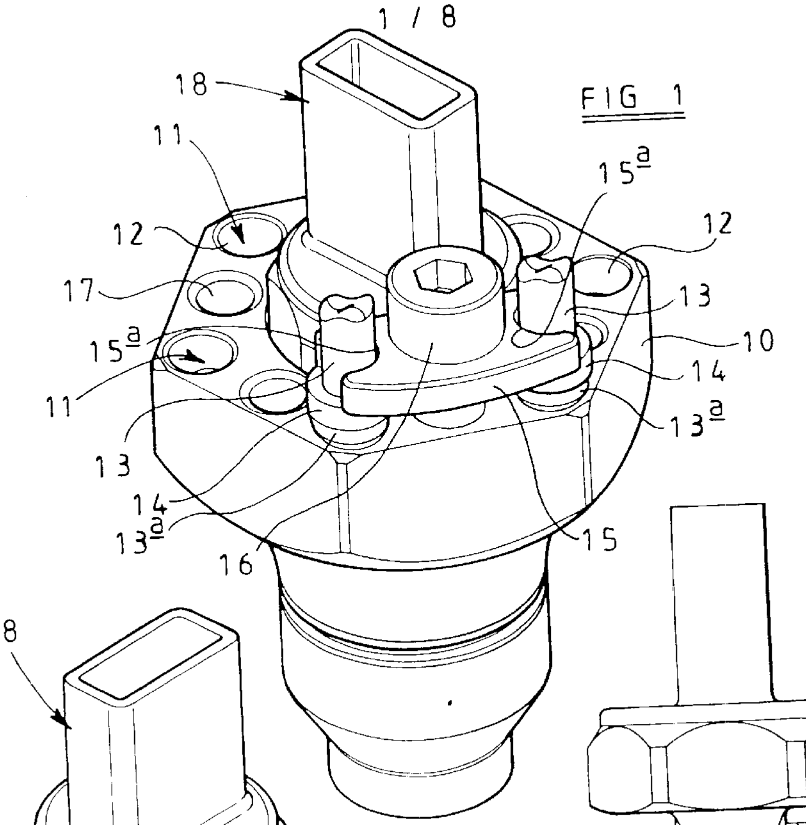
FIG. 1 is a perspective view of a connector arrangement in accordance with an embodiment of the invention.

FIG. 1 illustrates a connector arrangement which comprises an accumulator housing 10 forming part of a fuel pump, the accumulator housing 10 being shaped to define an internal accumulator chamber. The accumulator housing 10 is provided with a plurality of passages 11 which communicate with the chamber and which open into outlet ports 12 provided, in the orientation illustrated, at the upper surface of the accumulator housing 10. A plurality of fuel pipes 13 are provided, the fuel pipes 13 being adapted, adjacent their end regions, for cooperation with the outlet ports 12 such that the application of a clamping load to the high pressure fuel pipes 13 clamps the pipes 13 to the accumulator housing 10, forming a substantially fluid tight seal between each fuel pipe 13 and the accumulator housing 10 such that the interior of each high pressure fuel pipe 13 communicates with the accumulator chamber. Each high pressure fuel pipe 13 includes, adjacent its end, a region 13*a* of enlarged diameter, upon which an annular member 14 sits.

A bridge member 15 is provided, the bridge member 15 being provided with an opening through which a bolt 16 extends, the bolt 16 including a screw-threaded shank which is received, in part, within a screw-threaded bore 17 formed in the accumulator housing 10. The bridge member 15 is shaped for cooperation with the annular members 14 of adjacent ones of the fuel pipes 13, each bridge member 15 including, at its opposite ends, a recess 15*a* which receives an adjacent part of one of the associated fuel pipes 13.

During assembly, the end regions 13*a* of the high pressure fuel pipes are located adjacent respective outlet ports 12 of the accumulator housing 10, and the bridge member 15 is located as illustrated in FIG. 1 such that the recesses 15*a* extend partially around respective ones of the high pressure fuel pipes 13. The annular members 14 are trapped between the bridge member 15 and the regions 13*a* of the high pressure fuel pipes 13. Once this position has been achieved, the bolt 16 is introduced through the opening of the bridge member 15 and located within the associated screw-threaded bore 17 of the accumulator housing 10. Rotation of the bolt 16 using a suitable tool then takes place to apply a clamping load to the bridge member 15 which, in turn, applies a clamping force to the fuel pipes 13 associated therewith, clamping the fuel pipes 13 to the accumulator housing 10 in such a manner as to form a high pressure seal between each high pressure fuel pipe 13 and the accumulator housing 10.

In the arrangement illustrated in FIG. 1, the ports 12 are located around the periphery of the upper end of the accumulator housing 10, and space is available for occupation by a pressure sensor arrangement 18 permitting monitoring of the fuel pressure within the accumulator chamber.

Although only a single bridge member 15 is illustrated, it will be appreciated that several such members will be used in practise, each bridge member being used to secure a pair of pipes in position.

Where the accumulator housing 10 forms part of a high pressure fuel pump intended for use in a common rail fuel system, it will be appreciated that by connecting the fuel pipes 13 directly to the accumulator housing 10, the provision of a separate common rail connected to the outlet of the fuel pump and to which the high pressure fuel pipes would normally be connected can be avoided. The common rail fuel system is therefore of reduced complexity and cost. If desired, the pipes 13 could be connected to an alternative part of the fuel pump.

Figure 2:
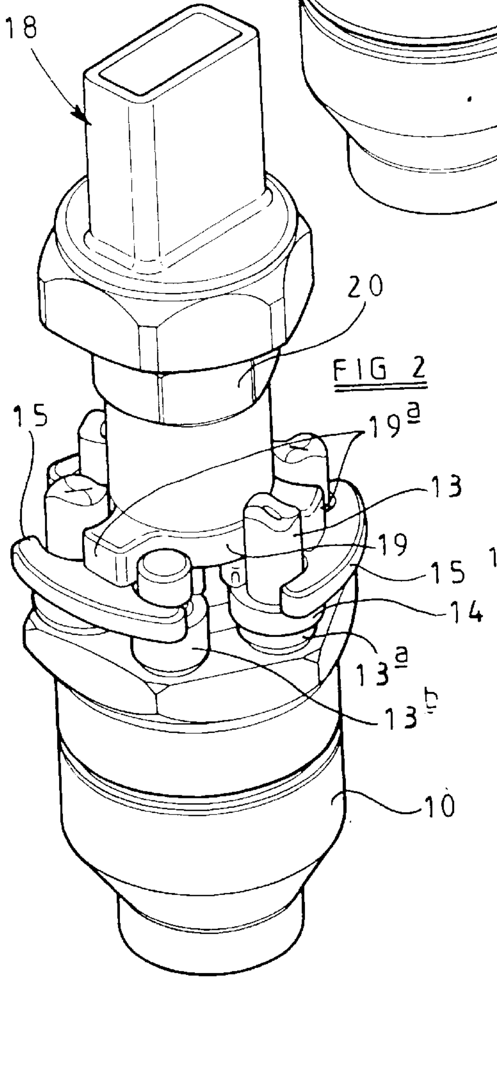
FIG. 2 is a view similar to FIG. 1 illustrating an alternative embodiment.
Figure 3:
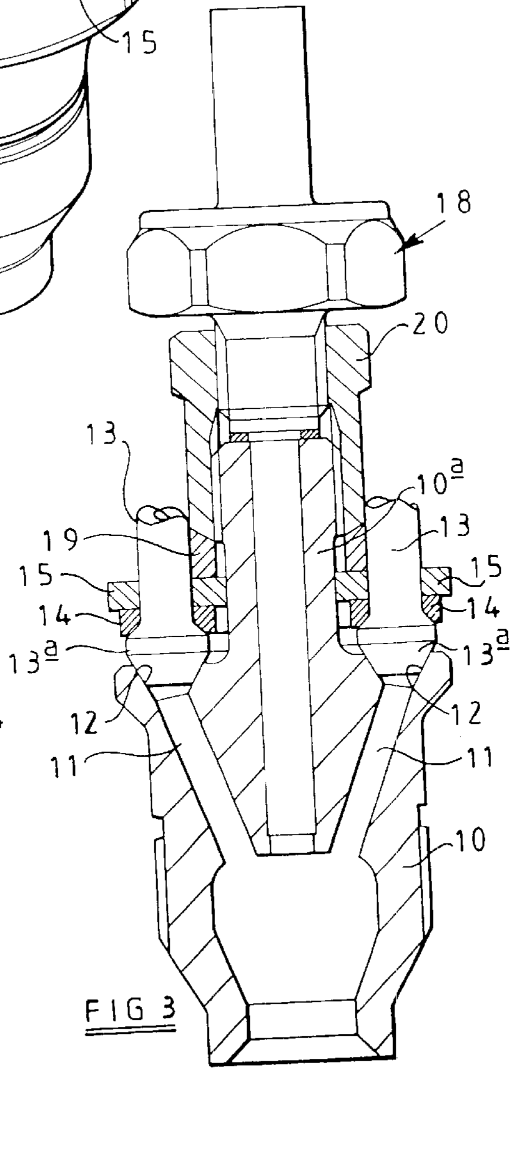
FIG. 3 is a sectional view of the embodiment of FIG. 2.

FIGS. 2 and 3 illustrate an alternative embodiment to that illustrated in FIG. 1, and like reference numerals are used to denote like parts. In the arrangement of FIGS. 2 and 3, rather than provide each bridge member 15 with an opening through which a bolt 16 extends, the accumulator housing 10 is provided with a central upwardly extending screw-threaded projection 10*a*. A load transmitting member 19 of generally annular form is located upon the screw-threaded projection 10*a,* the load transmitting member 19 being provided with a plurality of outwardly extending arms 19*a* which are shaped for cooperation with the bridge members 15 of the arrangement. A nut 20 is provided, the nut 20 being in screw-threaded engagement with the projection 10*a.*

During assembly, the high pressure fuel pipes 13 are located such that the enlarged end regions 13*a* cooperate with respective ones of the outlet ports 12. and bridge members 15 are provided between adjacent ones of the high pressure fuel pipes 13. Once the bridge members 15 have been so positioned, with the annular members 14 being located between the bridge members 15 and the enlarged diameter regions 13*a* of the fuel pipes 13, the load transmitting member 19 is located upon the projection 10*a* such that the arms 19*a* of the load transmitting member 19 cooperate with respective ones of the bridge member 15. After the load transmitting member 19 has been positioned, the nut 20 is introduced onto the screw-thread of the projection 10*a* and the nut 20 is rotated to apply a suitable clamping load to the load transmitting member 19, and through the bridge members 15 to the high pressure fuel pipes 13.

As illustrated most clearly in FIG. 3, the cooperation between the annular members 14 and the enlarged diameter regions 13*a* of the fuel pipes 13 conveniently permits the annular members 14 to tilt relative to the fuel pipes 13 thereby ensuring that an even load can be applied to both of the fuel pipes associated with each bridge member 15. Although not shown, this is also true of the embodiment of FIG. 1. Further, the upper surface of the load transmitting member 19 and the lower surface of the nut 20 are conveniently of part-spherical or conical form to permit slight tilting of the load transmitting member 19 relative to the nut 20.

FIG. 2 illustrates the situation where the accumulator housing 10 includes a greater number of outlet ports 12 than required. In such an arrangement, one or more of the outlet ports 12 may be closed by means of a blanking member 13*b* which is clamped in position using the bridge member 15 in the manner described hereinbefore, the blanking member 13*b* simply replacing one of the high pressure fuel pipes 13.

As with the arrangement of FIG. 1, the accumulator housing conveniently carries a fuel pressure sensor 18 permitting monitoring of the fuel pressure within the accumulator chamber. The manner in which the fuel pressure sensor 18 is mounted may also act as a lock nut preventing or limiting rotation of the nut 20, in use, thereby reducing the risk of one or more of the high pressure fuel pipes 13 being released from the accumulator housing 10, in use.

Although the embodiments described hereinbefore are capable of permitting the connection of six high pressure fuel pipes to an accumulator housing 10, it will be appreciated that these embodiments may be modified to permit the connection of other numbers of high pressure fuel pipes, if desired. In the arrangement of FIGS. 2 and 3, if a modification is made to permit the connection of only four high pressure fuel pipes to the accumulator housing 10, then it will be appreciated that the load transmitting member 19 may be modified to include only two arms 19*a* rather than three as in the embodiment illustrated. If only three high pressure fuel pipes are to be connected to the accumulator housing 10, then the bridge members 15 and load transmitting member 19 may be formed integrally with one another.

Figure 4:
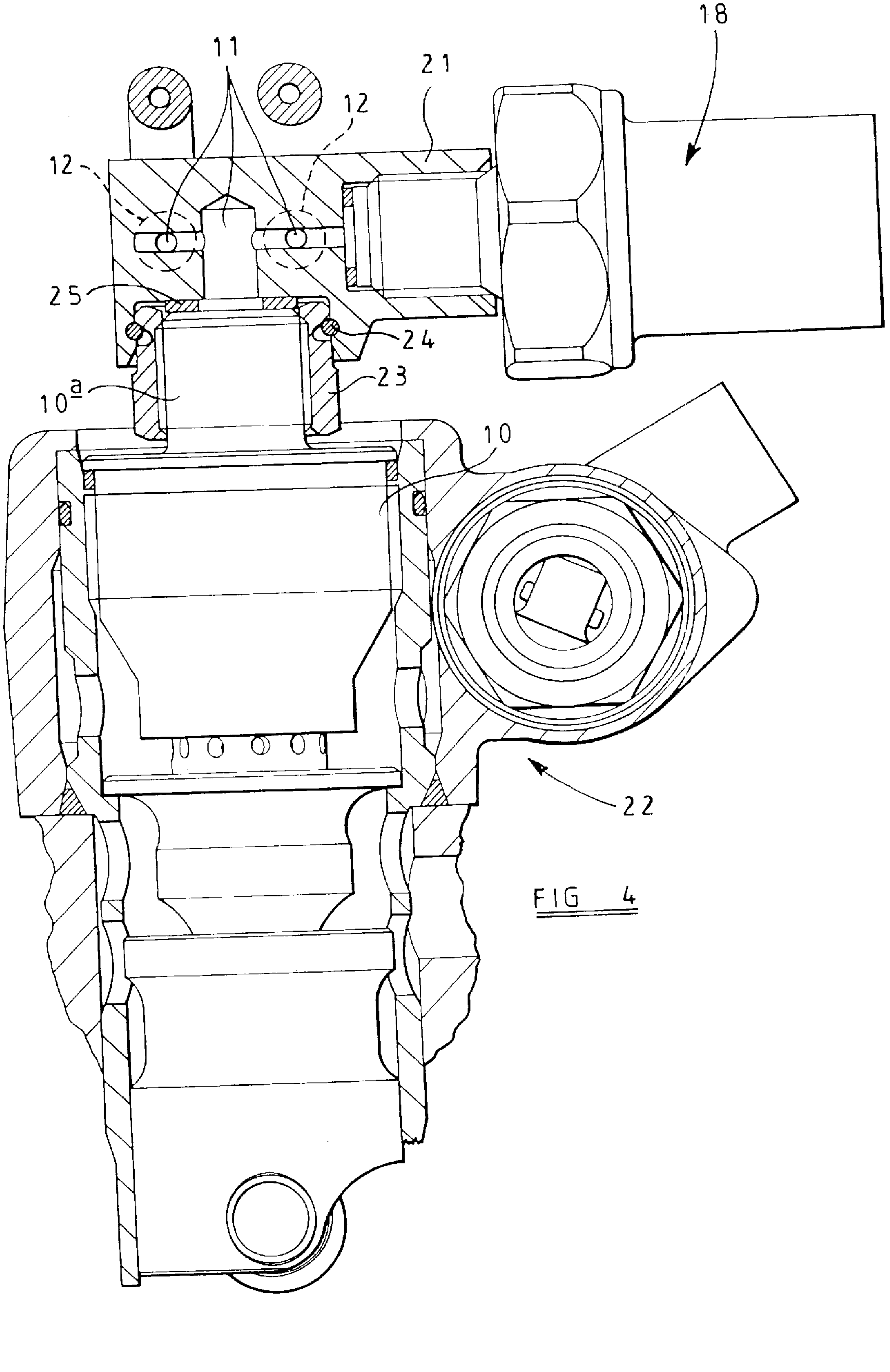
FIG. 4 is a sectional view illustrating a further embodiment.
Figure 5:
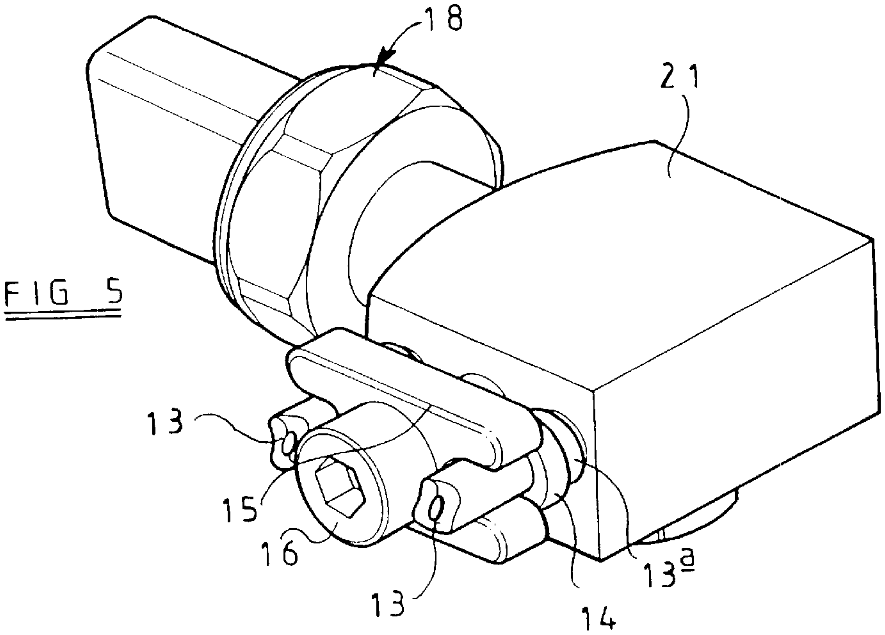
FIG. 5 is a perspective view illustrating the embodiment of FIG. 4.

FIGS. 4 and 5 illustrate an alternative embodiment in which rather than connecting the high pressure fuel pipes 13 directly to an accumulator housing 10 of a fuel pump, a housing in the form of a manifold 21 is provided, the manifold 21 being mounted upon an outlet of a high pressure fuel pump 22 and having a plurality of outlet ports 12 to which high pressure fuel pipes 13 are connected, for example using the technique illustrated in FIG. 1. It will be appreciated, however, that if desired, the arrangement illustrated in FIGS. 2 and 3 could be used to secure the high pressure fuel pipes to the manifold 21. The manifold 21 is conveniently designed to permit the mounting of a fuel pressure sensor 18 thereto.

The manifold 21 is conveniently mounted upon the accumulator housing 10 of the fuel pump 22 using a nut 23 which cooperates a screw-threaded projection 10*a* of the accumulator housing 10, the nut 23 being provided, at its outer periphery, with a groove which receives a snap-ring 24, the snap-ring 24 being received within a similar groove provided in the manifold 21. Rotation of the nut 23 provides a clamping load which is transmitted through the snap-ring 24 to compress a washer 25 located between the manifold 21 and the projection 10*a*. It will be appreciated that as the clamping load is applied through the snap-ring 24, the angle of the manifold 21 relative to the housing of the fuel pump 10 can be adjusted to any desired angle without affecting the magnitude of the clamping load between the manifold 21 and the accumulator housing 10.

Figure 6:
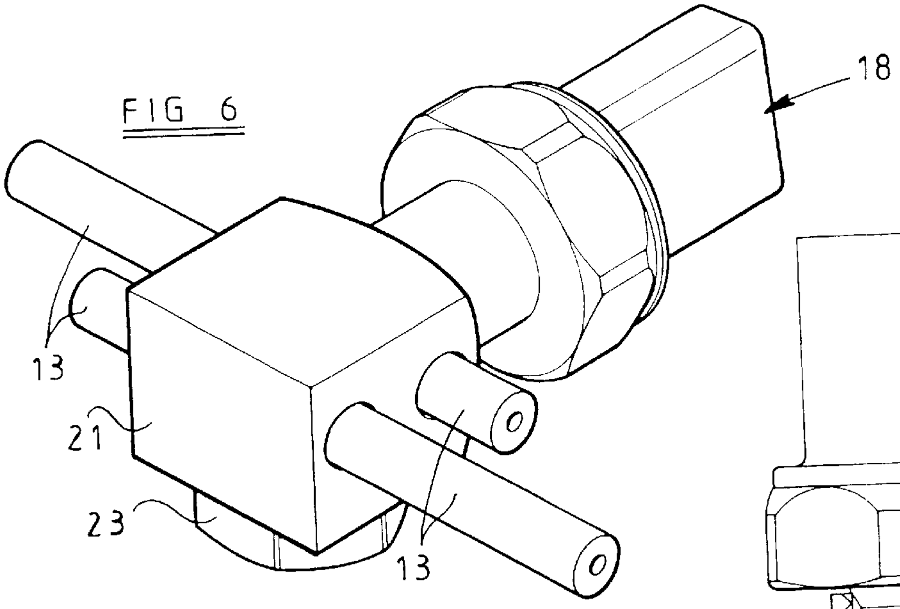
FIGS. 6 and 7 are perspective and sectional views, respectively, of a further embodiment.
Figure 7:
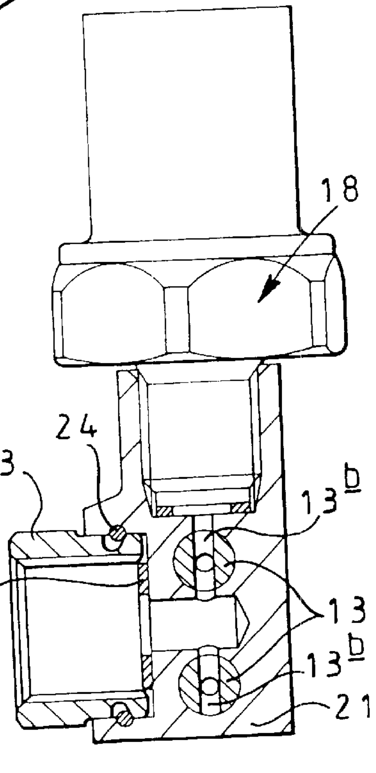

FIGS. 6 and 7 illustrate a modification to the arrangement illustrated in FIGS. 4 and 5 in which rather than using a bridge member 15 and bolt 16 to secure the high pressure fuel pipes 13 to the manifold 21, the high pressure fuel pipes 13 are permanently secured to the manifold 21, for example using a brazing or welding technique. In order to minimise the stresses placed upon the welded or brazing joints, in use, the high pressure fuel pipes 13 can pass completely through the manifold 21 such that the axial hydraulic forces applied thereto are balanced. In such an arrangement, cross holes 13*b* must be drilled in the pipes 13 to permit communication between the interior of the pipes 13 and the passages 11 of the manifold 21. The manifold 21 is conveniently arranged to be secured to a high pressure fuel pump 22 using the technique described hereinbefore with reference to FIG. 4.

Figure 8:
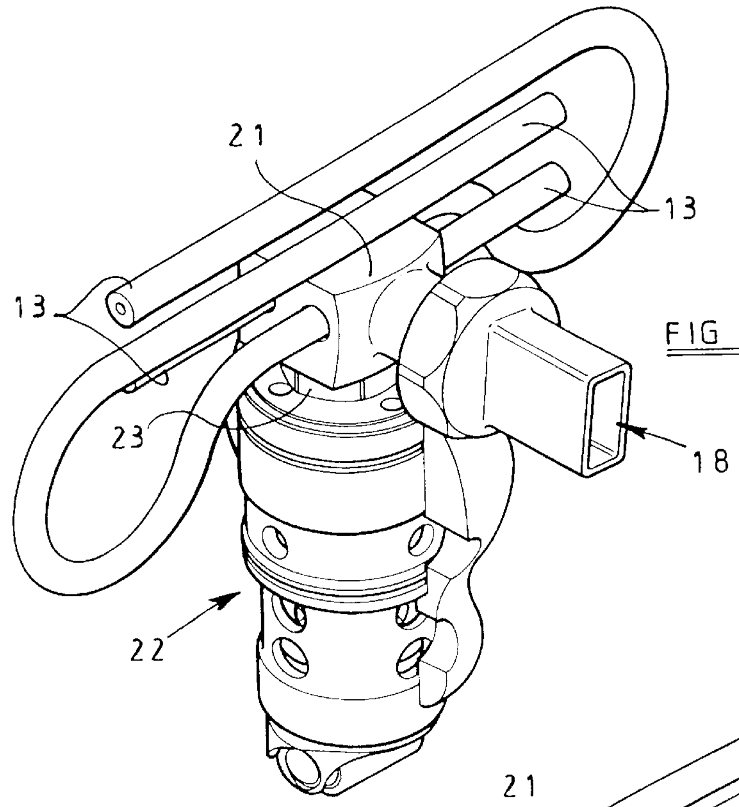
FIGS. 8 to 13 illustrate various applications of the connector arrangement.
Figure 9:
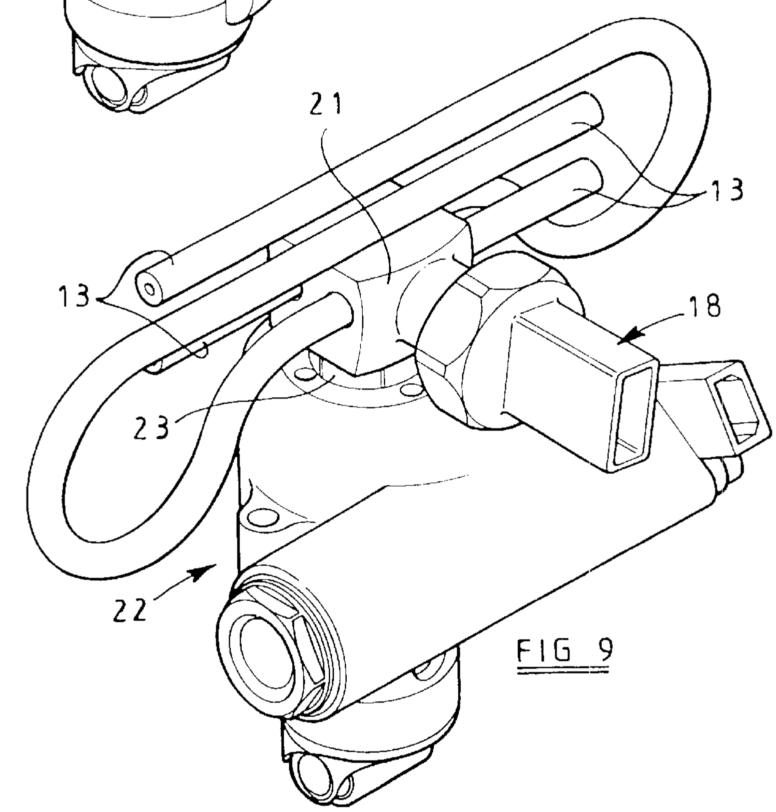
Figure 10:
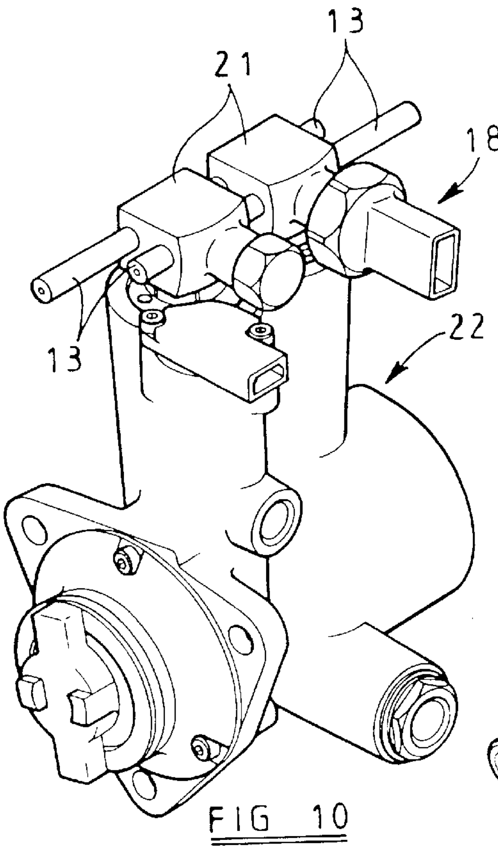
Figure 11:
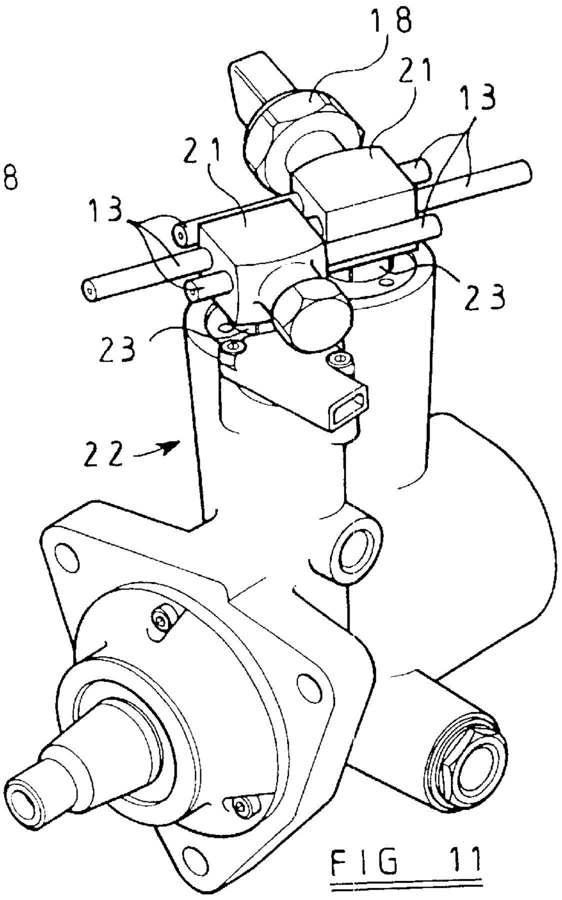
Figure 12:
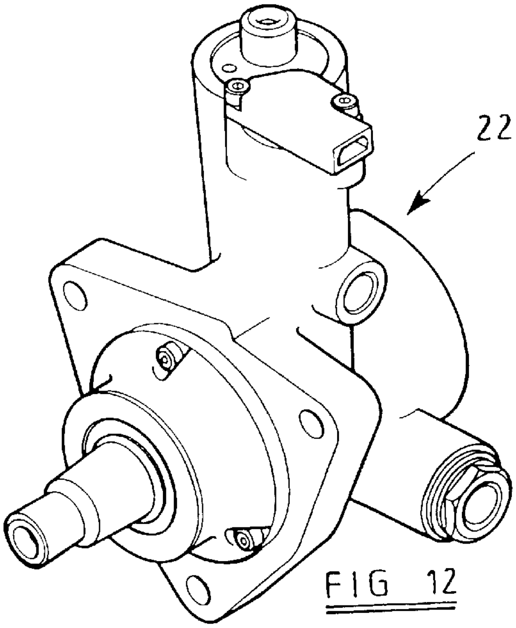

FIGS. 8 and 9 illustrate a manifold 21 which is designed to permit four fuel injectors to be connected through the high pressure fuel pipes 13 to the manifold 21 and hence to the fuel pump 22. In this case, the fuel pump is a single cylinder fuel pump. FIGS. 10 and 11 illustrate the use of the same manifold 21 with a twin cylinder fuel pump, the arrangement of FIG. 10 being arranged to feed four fuel injectors, and that of FIG. 11 being arranged to feed six fuel injectors. It is apparent from FIGS. 10 and 11 that, in such arrangements, two such manifolds 21 are provided, each manifold 21 being associated with a corresponding one of the cylinders of the fuel pump.

Although the manifolds illustrated in FIGS. 8 to 11 are of the type described hereinbefore with reference to FIGS. 6 and 7, it will be appreciated that, if desired, the fuel pipes 13 may be secured thereto 5 using other ones of the techniques described hereinbefore.

Figure 13:
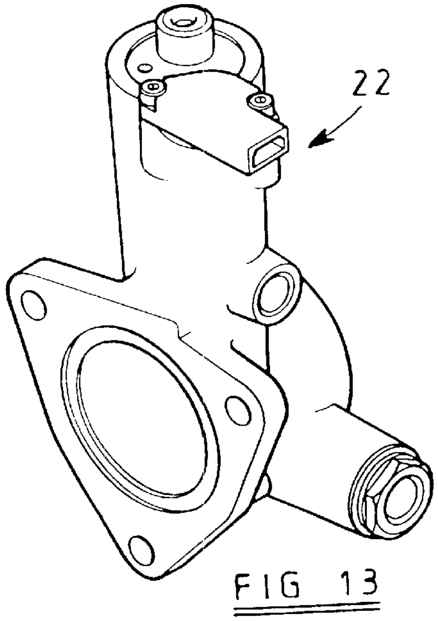

FIGS. 10 to 13 further illustrate that the fuel pump may be arranged to be driven using a variety of conventional techniques, for example using an Oldham coupling, a conventional conical drive coupling arrangement, or by being driven directly from, for example, an engine cam shaft (see FIG. 13).

If desired, the technique described hereinbefore using a snap-ring 24 to couple the manifold 21 to the accumulator housing 10 may be replaced by a simple screw-threaded coupling arrangement, the nut 23 being provided both with an interior screw-thread formation to couple the nut 23 to the projection 10*a*, and an outer thread which is either of different pitch or oppositely handed to the thread provided on the interior of the nut 23, the exterior thread being arranged to cooperate with a screw-thread provided on the manifold 21.

FIG. 14 illustrates a further alternative embodiment of the invention. in which the connector arrangement comprises first and second high pressure fuel pipe 110,112 for supplying fuel under high pressure to a plurality of fuel injectors (not shown) forming part of an engine. The connector arrangement also comprises an inlet member 114 which defines a common inlet passage 116 for fuel, the inlet passage 116 communicating with the high pressure fuel pipes 110,112 such that fuel supplied to the inlet passage 116 flows into the fuel pipes 110,112. Each of the fuel pipes 110,112 defines two flow passages for fuel, 110*a*,110*b* and 112*a*,112*b* respectively, each of the flow passages 110*a*, 110*b*, 112*a*,112*b* having an outlet region 118 which communicates, in use, with an inlet region (not shown) of a respective fuel injector. The flow passages 110*a*,110*b*, 112*a*, 112*b* communicate with the inlet passage 116 by means of cross drillings 120 provided in the high pressure fuel pipes 110,112.

As can be seen in FIG. 14, the pipes 110,112 are non-linear and are arranged such that each of the flow passages 110*a*,110*b*, 112*a*,112*b* between the point of communication with a common inlet passage 116 and the respective injector inlet region has substantially the same length. This helps to improve fuelling consistency between the injectors. It will be appreciated that, in order to ensure the flow passages 110*a*,110*b*, 112*a*,112*b* between the inlet passage 116 and the respective injector inlet region are of substantially the same length, the pipes 110,112 will be provided with bends the pipe carrying fuel to injectors having a location in the engine closer to the inlet passage 116 being bent by a greater amount than the pipe carrying fuel to the injectors having a location further from the inlet passage 116. As well as permitting each of the flow passages 110*a*,110*b*, 112*a*,112*b* to have a substantially equal length, the provision of bends in the pipes gives enough flexibility to compensate for thermal expansion effects. When installed, the connector arrangement may be mounted either above or beneath the cam cover of the associated engine.

The connector arrangement may also be provided with a plurality of attachment members 122 (only four of which are shown in FIG. 14). The attachment members 122 may be secured to the pipes 110,112 by any suitable means such as, for example, a clip arrangement. The attachment members 122 enable other components within the engine to be attached to the pipes 110,112. For example, each of the attachment members 122 may define an aperture for receiving electrical wiring or a low pressure fuel pipe to provide a convenient means of mounting the wiring or the piping within the engine.

To assemble the connector arrangement, the inlet member 114 is provided with a bore to define the inlet passage 116 and the cross drillings 120 are formed within the pipes 110,112. The inlet member 114 is also provided with two through bores into which the high pressure fuel pipes 110,112 are inserted. The pipes 110,112 are then secured within the bores of the inlet member by means of a suitable technique. For example, the pipes 110,112 may be secured within the bores by means of welding, brazing or by pressuring the pipes such that they expand to form an interference fit within their respective bore. As the pipes 110,112 extend through the inlet member 114, one end of each pipe projecting through an open end of the respective bore, hydraulic forces on the pipes 110,112 are balanced and the pipes are not subjected to large axial forces.

In an alternative method. the inlet passage 116 provided in the inlet member 114 and the cross drillings 120 provided through the pipes 110,112 may be formed following insertion of the pipes 110,112 through the bores of the inlet member 114.

Figure 16:
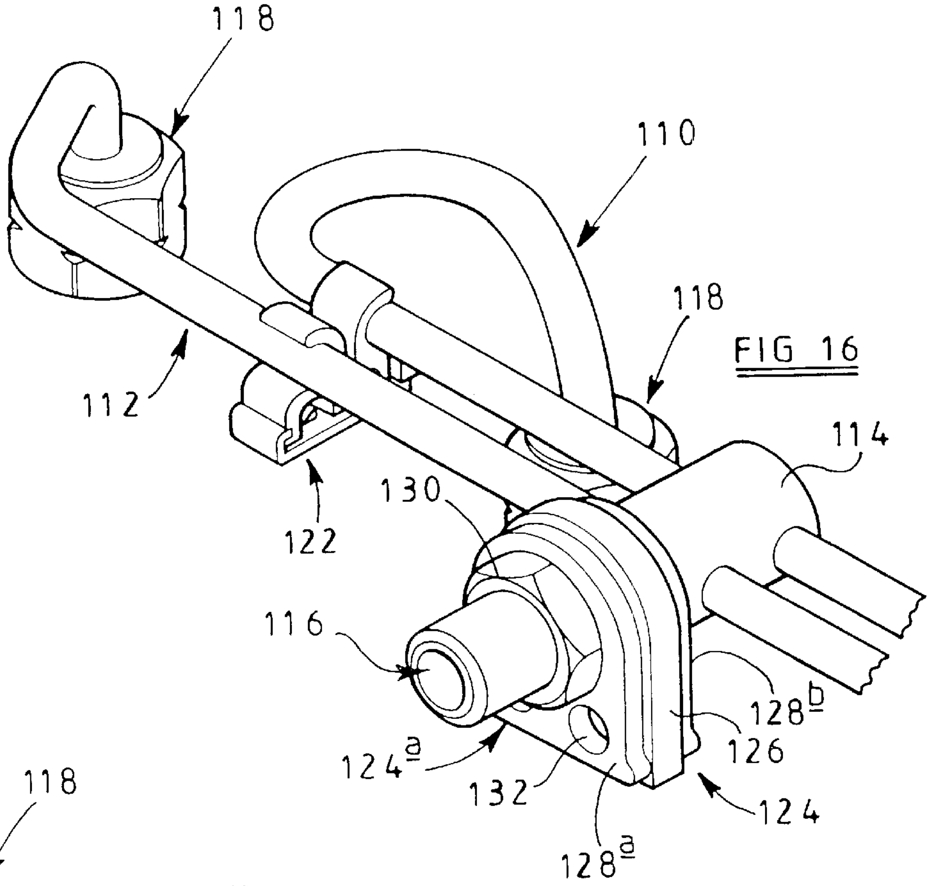
FIG. 16 is a perspective view of a part of the connector arrangement in FIGS. 14 and 15, showing a seal assembly.

With reference to FIGS. 15 and 16, the connector arrangement may be provided with a seal assembly, referred to generally as 124, to provide a substantially fluid tight seal between the cam cover and the engine block. The seal assembly includes a resilient seal member 126 and first and second plate members 128*a*, 128*b*, the seal member 126 being located between the first and second plate members 128*a*, 128*b* and being secured in position by means of a nut 130. The seal member 126 and the plate members 128*a*, 128*b* are provided with an aperture through which the inlet member 114 extends. The seal assembly 124 also has a substantially flat lower surface 124*a* which is engageable with a surface associated with the cam cover or the engine block of the engine when the connector arrangement is installed in the engine. Upon assembly, a force is applied to the plate members 128*a*, 128*b* by tightening the nut 130 such that the seal member 126 is pushed outwardly to sealingly engage the surface of the cam cover or the engine block. As well as providing a substantially fluid tight seal, engagement between the seal member 126 and the cam cover or the engine block also serves to minimise vibration of the inlet member 114 when the engine is in use. As shown in FIG. 16, the seal assembly 124 may be provided with a further aperture 132 for receiving other components within the engine, for example electrical wiring or a low pressure pipe, the internal diameter of the aperture 132 engaging a surface of the component in such a way as to provide a substantially fluid tight seal.

Figure 17:
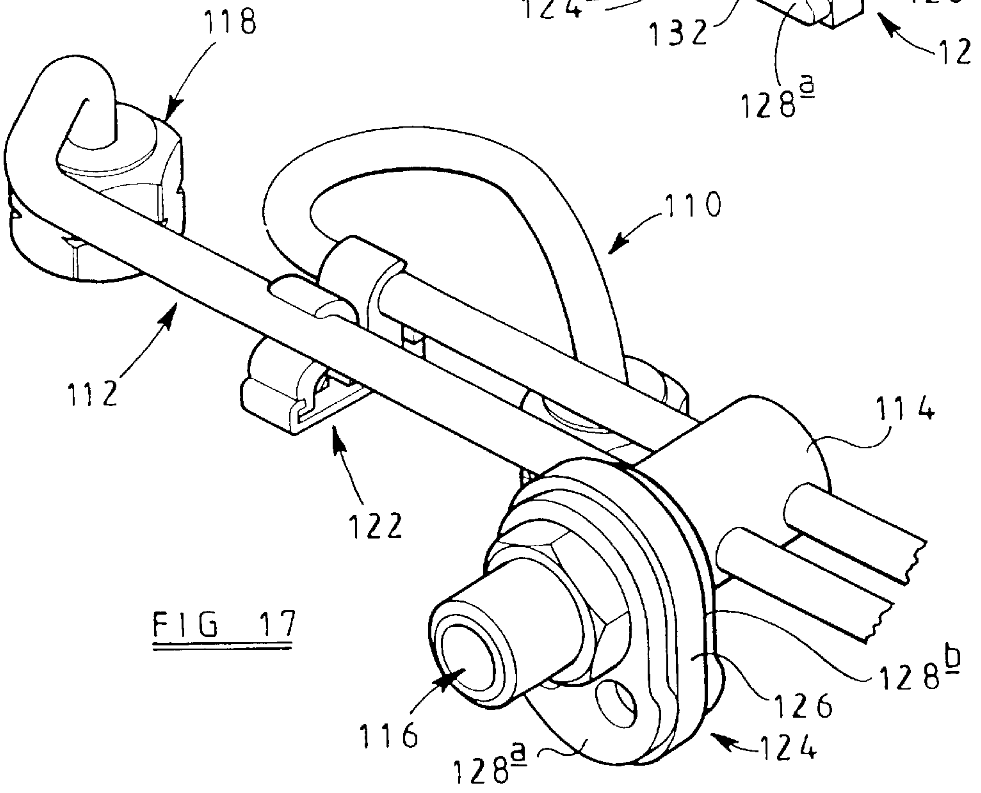
FIG. 17 is a perspective view of a part of a connector arrangement in accordance with a further alternative embodiment.

FIG. 17 shows an alternative embodiment of the invention in which like reference numerals are used to denote similar parts to those shown in FIGS. 14 to 16. In this embodiment, the seal assembly 124 is shaped to be received within an aperture in either the cam cover or the engine block, as opposed to being provided with a flat surface. As described previously, upon assembly, a force is applied to the plates 128*a*,128*b* by tightening the nut 130 to deform the seal member 126 such that a substantially fluid tight seal is provided between the seal member and the aperture within which it is received.

Figure 18:
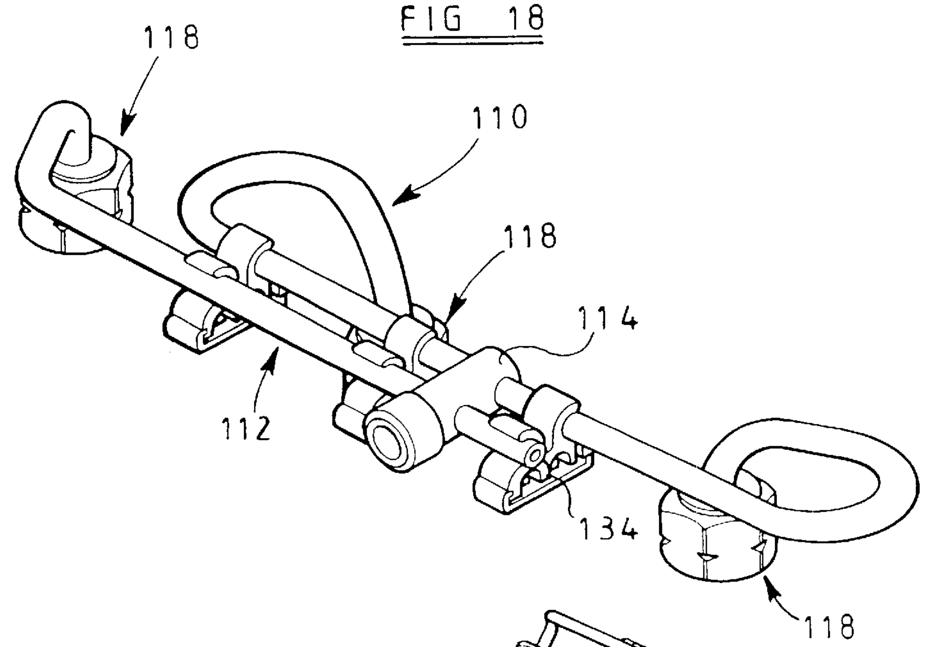
FIGS. 18 and 19 are further alternative embodiments of the connector arrangement.

Referring to FIG. 18, there is shown an alternative embodiment of the invention in which an odd number of outlet regions 118 are required to deliver fuel to an odd number of fuel injectors (not shown). In this case, the inlet member 114 is still provided with two through bores for receiving the pipes 110,112, one open end of the pipe 112 being closed by means of a closure member 134. Preferably, the closure member 134 is received within the pipe 112 to close the open end thereof, rather than engaging the outer surface of the pipe 112. This provides the advantage that hydraulic forces on the closure member 134 are reduced when in use. Conveniently, the closure member 134 may be welded brazed or screwed within the pipe 112. Alternatively, a combination of any of these methods may be used to seal the closure member 134 within the pipe 112.

Figure 19:
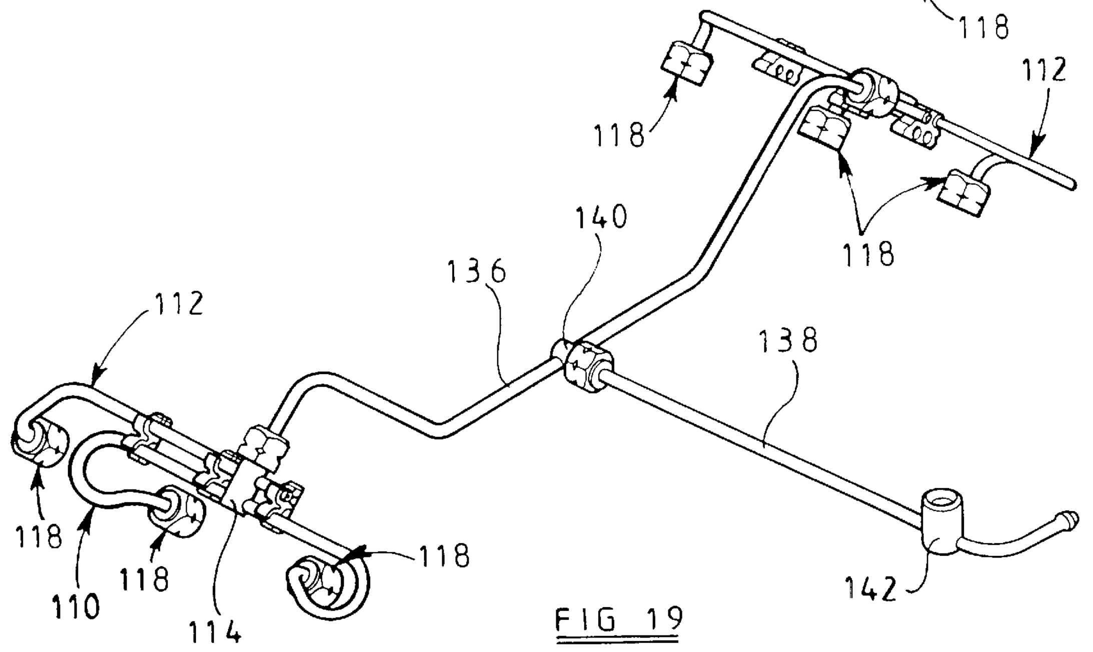

FIG. 19 shows a further alternative embodiment of the invention comprising two connector arrangements as shown in FIG. 18, each arrangement being arranged such that the inlet member 114 thereof receives fuel from a common inlet pipe 136, the inlet pipe 136 receiving fuel from a further pipe 138 in communication with a high pressure fuel supply. The arrangement in FIG. 19 is particularly suitable for use in a "vee" type engine.

An inlet member 140 is associated with the pipes 136,138, the inlet member 140 being provided with a through bore through which the pipe 136 extends. Conveniently, the pipe 136 is arranged within the inlet member 140 in the same way as the pipes 110,112 are arranged within the inlet member 114. It will be appreciated that the connector arrangement in FIG. 19 is suitable for use in an engine having six fuel injectors, each one of the six injectors receiving fuel from one of six outlet regions 118 of the connector arrangement. If desired, the pipe 138 may be provided with a further member 142 to which a pressure, temperature or other type of sensor may be attached.

It will be appreciated that the present invention is suitable for use in an engine having a different number of injectors to that described previously. Furthermore, it will be appreciated that more than two high pressure fuel pipes may be provided through the inlet member 114, each pipe being provided with one or more outlet regions 118 to permit fuel delivery to a respective injector.

What is claimed is:

1. A connector arrangement for use in a fuel system, the connector arrangement comprising a plurality of high pressure fuel pipes, each having a pipe length, said pipes being supplied, in use, with fuel from a common inlet passage, the common inlet passage being arranged, in use, to receive fuel from a high pressure fuel supply, each of the pipes comprising one or more outlet regions which is connectable with an inlet region of a respective injector forming 11 of the fuel system to permit high pressure fuel to be supplied to said injector, the common inlet passage being defined by an inlet member provided with two through bores, each of the through bores having a high pressure fuel pipe extending therethrough.

2. The connector arrangement as claimed in claim 1, wherein each of the high pressure pipes defines at lea t one flow passage for fuel between the common inlet passage and the inlet region of an associated injector.

3. The connector arrangement as claimed in claim 2, where each of the flow passages for fuel has substantially the same length.

4. The connector arrangement as claimed in claim 1, wherein the common inlet passage is arranged to communicate with each of the high pressure fuel pipes part way along the pipe length.

5. The connector arrangement as claimed in claim 1, including a further pipe and a further inlet member, the further pipe being arranged to communicate with the common inlet passage and a high pressure fuel supply.

6. The connector as claimed in claim 5, wherein each end of the further pipe is arranged to communicate with the common inlet passage of a further connector arrangement comprising a plurality of further high pressure fuel pipes which are supplied with fuel from the co on inlet passage, each of the further pipes comprising one or more further outlet regions which is connectable with a further inlet of a respective injector.

7. The connector arrangement as claimed in claim 1, wherein high pressure fuel pipes is provided with a cross drilling to permit communication between the high pressure fuel pipe and the common inlet passage.

8. The connector arrangement as claimed in claim 1, wherein at least one of the high pressure fuel pipe is provided with a closure member to seal an open end of the respective fuel pipe.

9. The connector arrangement as claimed in claim 1, for use in an engine having a cam cover and an engine block, the connector arrangement further comprising a seal assembly for providing a substantially fluid tight seal between the connector arrangement and the cam cover and/or the engine block.

10. A seal assembly for use with a connector arrangement as claimed in claim 1, the seal assembly comprising a resilient seal member and first and second plate members, the first and second plat members being arranged to apply a force to opposing faces of the seal member such that, upon assembly of the seal assembly, the application of a force to at least one of the plate members serves to deform the seal member into sealing engagement with a surface associated with the fuel system.

11. The seal assembly as claimed in claim 10, for use in an engine having a cam cover and an engine block, the seal member being arranged to sealingly engage a surface of the cam cover or the engine block.

12. The seal assembly as claimed in claim 11, wherein the seal member is provided with a substantially flat surface for engaging a substantially flat surface of the engine block or the cam cover to provided a substantially fluid tight seal.

13. The seal assembly as claimed in claim 11, wherein the seal member is shaped to be received within an aperture provided in the cam cover or the engine block.

14. A method of manufacturing a connector arrangement as claimed in claim 1 comprising the steps of;

providing an inlet ember with at least one through bore, inserting a pipe for carrying high pressure fuel through the bore, and forming an inlet passage through the inlet member such that the inlet passage communicates with a flow passage defined by the pipe to permit fuel in the inlet passage to be supplied to the flow passage, in use.

15. A seal assembly for use with a connector arrangement, the connector arrangement for use in a fuel system, the connector arrangement including a plurality of high pressure fuel pipes, each having a pipe length, said pipes being supplied, in use, with fuel from a common inlet passage, the common inlet passage being arranged, in use, to receive fuel from a high pressure fuel supply, each of the pipes comprising one or more outlet regions which is connectable with an inlet region of a respective injector forming part of the fuel system to permit high pressure fuel to be supplied to said injector, the seal assembly comprising a resilient seal member and first and second plate members, the first and second plate members being arranged to apply a force to opposing faces of the seal member such that, upon assembly of the seal assembly, the application of a force to at least one of the plate members serves to deform the seal member into sealing engagement with a surface associated with the fuel system.

16. The seal assembly as claimed in claim 15, for use in an engine having a cam cover and an engine block, the seal member being arranged to sealingly engage a surface of the cam cover or the engine block.

17. The seal assembly as claimed in claim 15, wherein the seal member is provided with a substantially flat surface for engaging a substantially flat surface of the engine block or the cam cover to provided a substantially fluid tight seal.

18. The seal assembly as claimed in claim 15, wherein the seal member is shaped to be received within an aperture provided in the cam cover or the engine block.

* * * * *